United States Patent

Van Order et al.

[11] Patent Number: 6,038,937
[45] Date of Patent: Mar. 21, 2000

[54] SHIFTER WITH INTEGRAL CONNECTOR

[75] Inventors: Kim L. Van Order, Hamilton; Nels R. Smith; Scott A. Hansen, both of Holland, all of Mich.

[73] Assignee: Prince Corporation, Holland, Mich.

[21] Appl. No.: 09/048,542

[22] Filed: Mar. 26, 1998

[51] Int. Cl.[7] .............................. B60K 20/00; H01H 9/06
[52] U.S. Cl. ......................... 74/473 R; 74/475; 74/557; 74/543; 74/523; 200/61.85; 200/61.88
[58] Field of Search ................... 74/475, 538, 473 R, 74/537; 200/61.88

[56] References Cited

U.S. PATENT DOCUMENTS

| | | | |
|---|---|---|---|
| 3,198,922 | 8/1965 | Rohacs | 200/61.85 |
| 4,191,064 | 3/1980 | Houk et al. | 74/475 |
| 4,199,747 | 4/1980 | Miller et al. | 200/61.88 X |
| 4,360,718 | 11/1982 | Schobingeret | 200/61.88 |
| 4,822,962 | 4/1989 | MacCourt | 200/61.88 |
| 5,179,870 | 1/1993 | Behrens et al. | 74/475 |
| 5,247,849 | 9/1993 | Sato | 74/475 |
| 5,372,051 | 12/1994 | Kanematsu et al. | 74/473 R |
| 5,458,017 | 10/1995 | Kanematsu et al. | 74/475 |
| 5,706,701 | 1/1998 | Murakami | 74/473 R X |

FOREIGN PATENT DOCUMENTS 912571 3/1982 U.S.S.R. .................. 74/538

*Primary Examiner*—Vinh T. Luong
*Attorney, Agent, or Firm*—Price, Heneveld, Cooper, DeWitt & Litton

[57] ABSTRACT

A shift knob integrally includes one of a plug or socket having fixed contacts which are coupled to a control switch mounted to the shift knob. The plug or socket is mounted to a sleeve which integrally includes the other of a socket and plug with fixed contacts precoupled to the transmission wire harness such that during assembly it is only necessary for the shift knob to be mounted onto the knob-receiving sleeve to make both mechanical and electrical contact with the transmission. In a preferred embodiment, the shift knob includes a keyed plug with the contacts recessed within a housing of the plug.

8 Claims, 1 Drawing Sheet

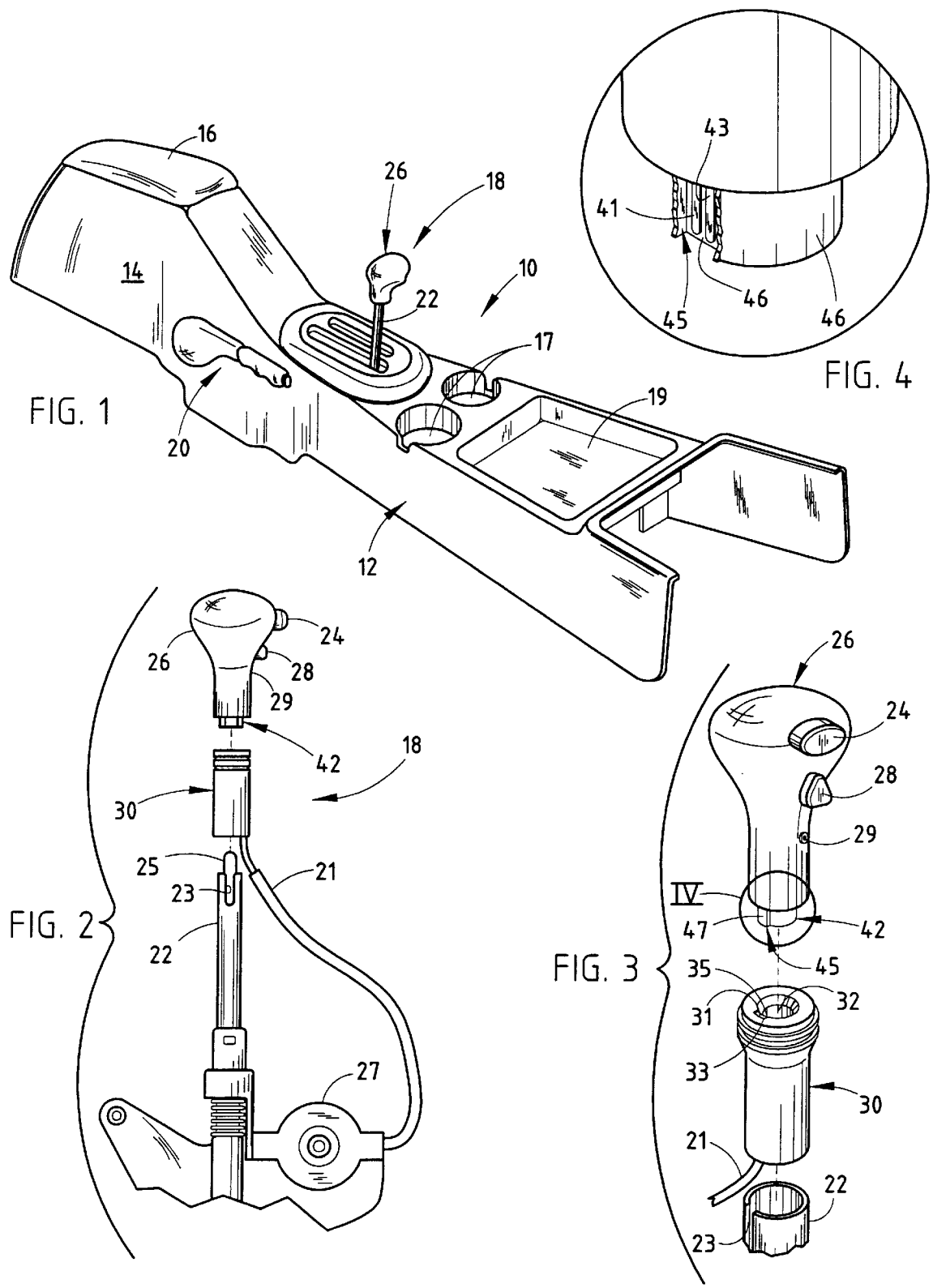

SHIFTER WITH INTEGRAL CONNECTOR

BACKGROUND OF THE INVENTION

The present invention relates to a shift control for an automatic transmission for a vehicle and particularly one for use with a floor console mounted transmission shifter mechanism.

Conventional shift controls for use in connection with floor-model automatic transmission shifters use knobs which include a wire pigtail which is routed through a sleeve associated with the shifting stem of the transmission and includes a connector at one end which subsequently is attached to a wire harness connector to complete the electrical connection of a switch associated with the shifter knob to the transmission control. Typically, this switch is employed to control an over-drive solenoid for the transmission, although it can be utilized with other transmission controls, such as shifting to all-wheel drive or the like. During manufacturing of the vehicle, it is necessary to manually guide the wires from the shift knob downwardly through a coupling sleeve which is attached to the top of the shift stem and subsequently connect the wire to a mating connector on a transmission wire harness. The routing of the relatively small wires through the mounting sleeve and the subsequent connection of the pigtail to the harness can be somewhat difficult and time consuming during the intense activity on an assembly line operation. Also, the pigtail can easily be crimped or the wires broken away from the control switch during assembly. Further, the wire pigtail, when routed through the sleeve, can be a source of annoying rattling noise during vehicle operation. Thus, there exists a need for the elimination of this prior construction to speed up and simplify the manufacturing operation, lower the cost of the vehicle, as well as improve the reliability of the resultant assembly.

SUMMARY OF THE PRESENT INVENTION

The system of the present invention provides a solution to the existing problem by providing a shift control, such as a shift knob, which integrally includes one of a plug or socket therein having fixed contacts which are coupled to a control switch carried by the shift control. The plug or socket is mounted directly to a sleeve which integrally includes the other of a socket and plug which includes mating fixed contacts precoupled to the transmission wire harness such that during assembly it is only necessary for the shift knob to be plugged into the knob-receiving sleeve to complete both the mechanical and electrical coupling. Such a system thereby eliminates the necessity for threading a wire pigtail through mounting structure and subsequently connecting the end of the pigtail to the existing wire harness, thereby improving the reliability of the system as well as reducing the parts cost and labor required in manufacturing a vehicle.

These and other features, objects and advantages of the present invention will become apparent upon reading the following description thereof together with reference to the accompanying drawings.

BRIEF DESCRIPTION OF THE DRAWINGS

FIG. 1 is a perspective view of a floor console including a shift control of the present invention;

FIG. 2 is an exploded fragmentary side elevational view of the shift control of the present invention;

FIG. 3 is an enlarged exploded fragmentary perspective view of the structure shown in FIG. 2; and FIG. 4 is a greatly enlarged exploded, partly cut away, fragmentary perspective view of the area shown in circle IV of FIG. 3.

DETAILED DESCRIPTION OF THE PREFERRED EMBODIMENT

Referring initially to FIG. 1, there is shown an integrated console 10 embodying the present invention. Console 10 includes a structural housing 12, which can be made of a rigid structural foam, polyurethane or other suitable polymeric material, covered by a suitable decorative surface 14 over the exterior of the console 10 to conform the appearance of the console to that of the vehicle interior. Such decorative trim may include upholstery material, finishing the molded housing with a textured surface and color or laminating the housing with a shell formed with the desired surface finish. The structural housing 12 has sufficient strength to integrally support the transmission control assembly 18 of the present invention preassembled to the housing and including the shift control coupling to the transmission utilizing structure described in U.S. patent application Ser. No. 08/886,571, filed on Jul. 1, 1997, and entitled VEHICLE CONSOLE WITH BUILT-IN VEHICLE TRANSMISSION SHIFTER HAVING CABLE TENSION ADJUSTMENT MECHANISM AND METHOD, now U.S. Pat. No. 5,887,485 issued on Mar. 30, 1999 the disclosure of which is incorporated herein by reference. Housing 12 also integrally supports a parking brake control assembly 20, which is also preassembled to the housing and includes a tension adjustment structure which is disclosed in greater detail in U.S. patent application Ser. No. 08/985,458, filed on Dec. 5, 1997 pending, and entitled INTEGRATED FLOOR CONSOLE, the disclosure of which is also incorporated herein by reference.

Console 10 further includes an armrest 16 conveniently located between the driver and passenger seats of a vehicle when the console is installed. Console 10 may also include a pair of container holders 17 positioned forwardly of the transmission control assembly 18 and a storage tray 19 which may or may not be covered and which accommodates items to be stored in a convenient location in the console. The armrest 16 may also include a storage compartment under the padded cover forming the top of the armrest, which compartment is located behind the parking brake assembly 20.

The transmission control 18 includes a hollow shaft 22 (FIGS. 2 and 3) with a movable control rod or straw 25 therein which is actuated by a mechanical push-button 24 associated with the shifter knob 26 of the transmission control mechanism 18. The mechanical push-button 24 and its coupling to movable straw 25 which, in turn, allows the shifter shaft 22 to move forwardly and rearwardly for shifting the transmission is conventional and is part of the shift control mechanism. The control knob 26 also integrally includes a push-button electrical switch 28 of conventional construction with a pair of contacts which, when switch 28 is pushed, provide a signal to the transmission which responds for shifting the transmission into and out of over-rive, for example, or providing any other desired vehicle drive control function, such as shifting into an all-wheel drive mode.

The transmission includes a wire harness 21 which in the prior art terminated in a connector to which a wire pigtail from the shifter knob switch was coupled. In the present invention, however, the conductors of harness 21 are coupled to electrical contacts in a cylindrical sleeve 30 which fits over shaft 22 and which mechanically and electrically couples to shift knob 26 during assembly. For such purpose, the sleeve includes a keyed socket or plug 32 (FIG. 3) shaped to receive a matingly-shaped keyed plug or socket 42 on shift control knob 26. Shaft 22 includes a slot 23 allowing the wiring harness 21 coupled to contacts 31 and 33 of sleeve 30 to extend to the transmission control 27, as best seen in FIG. 3. Knob 26 may also include an indicator, such as an LED 29, indicating that the operation of switch 28 has effected a particular transmission or other vehicle drive control function. Sleeve 30 typically will be press-fit or molded over the hollow shaft 22 during assembly. Contacts 31 and 33 are recessed in the keyway 35 of polymeric sleeve 30 so as not to electrically contact the metal shaft 22.

The shift knob 26 mechanically and electrically locks into the sleeve 30 to mechanically and electrically couple control 24 to stem 25 and switch 28 to the pair of conductors 21. As best seen in FIG. 4, the plug 42 associated with shift knob 26 includes a pair of contacts 41 and 43 which engage contacts 31 and 33 of sleeve 30 to couple the switch 28 to conductors 21 for providing a control signal to the transmission control 18. Switch 28 is coupled to contacts 41 and 43 utilizing internal conductors which can be integrally molded within the polymeric molded shift knob 26 which is otherwise of conventional construction and which may be covered by suitable leather, vinyl or other finish to conform to the interior of the vehicle. Preferably, the shift knob 26 includes a key-shaped profile with contacts 41 and 43 enclosed within a U-shaped housing 45 extending on the outer cylindrical wall 46 of the plug 42 so formed to protect the contacts and allow easy insertion of the shift knob 26 into the keyed socket 32 of mounting sleeve 30. For such purpose, the contacts 31 and 33 of sleeve 30 are spaced from the wall of keyway 35 to allow outer wall 47 (FIG. 3) of housing 45 to fit behind them. Such construction comprises contacts 31 and 33 against contacts 41 and 43 to assure a solid electrical connection while the plug defining housing 45 confines and insulates the electrical connection so formed. The shift knob 26 can also be fixedly secured to sleeve 30 in any desired manner, such as by a set screw or the like, for locking the shift knob in place once mechanically and electrically inserted into the sleeve.

In some embodiments of the invention, it may be desirable to provide an electrical socket in the control knob 26 and provide the plug in the sleeve, thus reversing the connection. Thus, with the system of the present invention, the shift knob for automatic transmission shift control integrally includes one of a plug and socket for mounting the control knob electrically and mechanically to the shift control shaft of the transmission shifter, thereby facilitating the assembly of the transmission control to a vehicle during manufacturing and providing a reliable electrical and mechanical coupling. It will become apparent to those skilled in the art that various modifications to the preferred embodiment of the invention as described herein can be made without departing from the spirit or scope of the invention as defined by the appended claims.

The invention claimed is:

1. A shift control for use with a vehicle automatic transmission having a shift control lever, said shift control comprising:
    a shift knob having an electrical plug including a pair of contacts formed at an end thereof and including electrical contacts;
    an electrical switch mounted to said shift knob and coupled to said contacts for providing an electrical signal to said contacts when actuated; and
    a sleeve for extending over a shift control lever, said sleeve including a socket for receiving said plug of said shift knob, said socket having contacts for coupling to said electrical plug of said shift knob, wherein said contacts of said plug are recessed within a U-shaped housing.

2. The shift control as defined in claim 1 wherein said housing defines a key.

3. The shift control as defined in claim 2 wherein said sleeve includes a keyway for receiving said key of said shift knob.

4. A shift knob for use with a vehicle automatic transmission having a shift control lever, said shift knob comprising:
    a knob for coupling to a shift control lever of an automatic transmission and an electrical switch, said switch coupled to a plug integrally formed on an end of said shift knob which includes a pair of contacts coupled to said switch contacts for electrically and mechanically coupling said shift knob to a shift control lever of an automatic transmission, wherein said end of said knob is cylindrical and contacts are recessed within a U-shaped housing defining a key extending from said cylindrical end of said shift knob, and further including an indicator light for activation by said switch.

5. The shift knob as defined in claim 4 in combination with a coupling sleeve for mounting to a shift control lever, said sleeve including a socket for receiving said plug of said shift knob.

6. The shift knob and sleeve as defined in claim 5 wherein said plug includes a housing which defines a key.

7. The shift knob and sleeve as defined in claim 6 wherein said contacts of said shift knob are recessed within said housing.

8. The shift knob and sleeve as defined in claim 7 wherein said sleeve includes a keyed socket for receiving said plug of said shift knob.

* * * * *